(12) United States Patent
Tsui et al.

(10) Patent No.: US 11,131,422 B2
(45) Date of Patent: Sep. 28, 2021

(54) MULTIFUNCTIONAL STAND FRAME FOR TABLET ELECTRONIC DEVICE

(71) Applicants: Yun-Chang Tsui, Taipei (TW); Sampson Yang, Irvine, CA (US); Hong-Zhang Lin, Taipei (TW)

(72) Inventors: Yun-Chang Tsui, Taipei (TW); Sampson Yang, Irvine, CA (US); Hong-Zhang Lin, Taipei (TW)

(73) Assignee: The Joy Factory, Inc., Irvine, CA (US)

(\*) Notice: Subject to any disclaimer, the term of this patent is extended or adjusted under 35 U.S.C. 154(b) by 0 days.

(21) Appl. No.: 16/658,184

(22) Filed: Oct. 21, 2019

(65) Prior Publication Data

US 2021/0116066 A1 Apr. 22, 2021

(51) Int. Cl.
| | |
|---|---|
| *F16M 11/06* | (2006.01) |
| *F16M 11/38* | (2006.01) |
| *F16M 13/02* | (2006.01) |
| *G06F 1/16* | (2006.01) |

(52) U.S. Cl.
CPC ............ *F16M 11/06* (2013.01); *F16M 11/38* (2013.01); *F16M 13/022* (2013.01); *G06F 1/1626* (2013.01)

(58) Field of Classification Search
USPC ...................................................... 248/122.1
See application file for complete search history.

(56) References Cited

U.S. PATENT DOCUMENTS

| 1,001,403 | A | * | 8/1911 | Hipwell | A47G 1/143 |
| | | | | | 40/747 |
| 9,074,725 | B2 | * | 7/2015 | Trotsky | H05K 5/0204 |
| 9,141,145 | B2 | * | 9/2015 | White | H05K 5/0004 |
| 9,250,652 | B2 | * | 2/2016 | London | G06F 1/163 |
| 2011/0279959 | A1 | * | 11/2011 | Lopez | A45F 5/00 |
| | | | | | 361/679.03 |
| 2011/0299231 | A1 | * | 12/2011 | Gaddis, II | H05K 5/023 |
| | | | | | 361/679.01 |
| 2013/0140312 | A1 | * | 6/2013 | Lane | G06F 1/1628 |
| | | | | | 220/315 |
| 2015/0237750 | A1 | * | 8/2015 | Yang | F16B 1/00 |
| | | | | | 206/45.2 |
| 2015/0257288 | A1 | * | 9/2015 | Livernois | H04B 1/3877 |
| | | | | | 248/346.06 |
| 2019/0052299 | A1 | * | 2/2019 | Lee | H04M 19/04 |

\* cited by examiner

*Primary Examiner* — Monica E Millner

(57) ABSTRACT

A multifunctional stand frame for a tablet electronic device comprises a seat; a bottom of the seat serving to connect a back side of a tablet electronic device; the seat having a plurality of retaining holes; in installing, the seat being connected to the tablet electronic device by using a connecting unit to pass through the retaining hole of the seat and a locking hole of the tablet electronic device; so that the seat is installed to the tablet electronic device; a disk being positioned above an upper side of the seat and being rotatably installed to the seat; a center of the disk having a through hole; a fixing shaft extending from an upper side of the seat and penetrating through the through hole of the disk; the disk being loosely arranged to the seat through the retaining hole and being rotatable with respect to the fixing shaft.

20 Claims, 7 Drawing Sheets

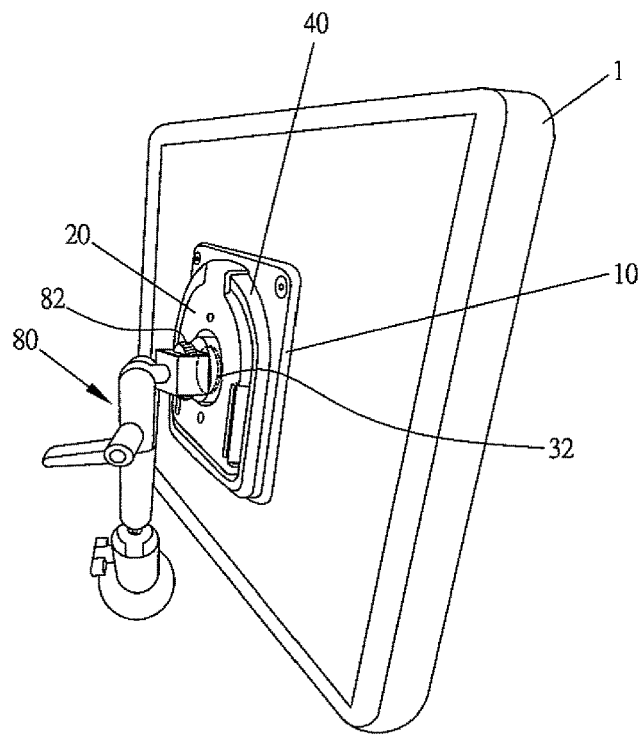
Fig. 11
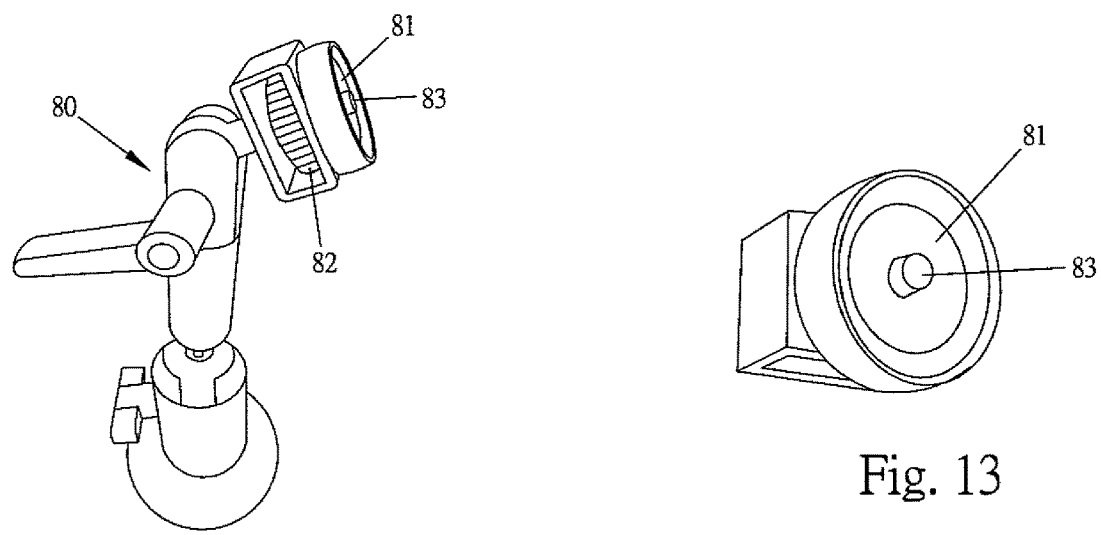
Fig.12
Fig. 13

MULTIFUNCTIONAL STAND FRAME FOR TABLET ELECTRONIC DEVICE

FIELD OF INVENTION

The present invention relates to stand frames for a tablet electronic device, and in particular to a multifunctional stand frame for a tablet electronic device.

BACKGROUND OF INVENTION

The stand frame of a prior art flat form electronic device mainly contains a seat. A bottom of the seat is fixed to a back side of a flat form electronic device; a disk is positioned above the seat and is rotatably installed on the seat; a center of the disk has a through hole; a retaining shaft is on the seat and penetrates through the through hole of the disk. The disk is loosely installed to the seat by using the retaining shaft so that the disk is rotatable around the retaining shaft. An upper side of seat at a position under the disk is formed with an annular recess. The disk is buckled to the recess by using a buckle. Therefore, the disk is slidable with respect to the seat continuously and thus rotates to various positions.

The stand frame further has a frame body. One end of the frame body is pivotally connected to one side of the disk so that it is pivotally rotatable with respect to the disk. When the disk is rotated, it will drive the frame body to rotate therewith. Therefore, the rotation is continuously (not step by step).

The stand frame further comprises a hand strap is fixedly retained across two sides of the disk. When a user's hand passes through a space between an arc portion of the hand strap and the disk, the hand strap will enclose the user's hand so that the user can take the flat form electronic device.

In above mentioned prior art, the disk is buckled to the annular recess by using the buckle. Thus the disk is rotatable with respect to the seat continuously to various positions. However, this kind of operation will cause that in supporting state, the frame body is easy to loose and thus it is difficult to be fixed on a specific position. For a long time, the frame body will vibrate and thus the lifetime thereof will reduce. Furthermore, the hand strap is fixed to two ends of the disk, and thus it is unreplaceable. If it is used for a long time, the hand strap is easy to wear or be dirt; however, these are unbeneficial in usage. Therefore, all these defects in the prior art are necessary to be improved.

SUMMARY OF THE INVENTION

To improve above defects in the prior art, the present invention provides a multifunctional stand frame for a tablet electronic device, wherein the disk is retained by the ball and the recess of the seat. When using, the disk is retained at specific location so as not to be loose. Therefore, the stand frame of the present invention can support the tablet computer stably. The user can also hang the stand frame of the present invention on a specific location. For a long time, the lifetime of the stand frame of the present invention is prolonged. Furthermore, the hand strap is replaceable and is easy to be replaced, and these are beneficial in usage. The stand frame of the present invention is capable of being screwed to another device, such as an external supporting object for supporting the stand frame of the present invention. All above mentioned advantages of the present invention cannot be achieved by any prior art.

To achieve above object, the present invention provides a multifunctional stand frame for a tablet electronic device comprising: a seat; a bottom of the seat serving to connect a back side of a tablet electronic device; the seat having a plurality of retaining holes; in installing, the seat being connected to the tablet electronic device by using a connecting unit to pass through the retaining hole of the seat and a locking hole of the tablet electronic device; so that the seat is installed to the tablet electronic device; a disk being positioned above an upper side of the seat and being rotatably installed to the seat; a center of the disk having a through hole; a fixing shaft extending from an upper side of the seat and penetrating through the through hole of the disk; the disk being loosely arranged to the seat through the retaining hole and being rotatable with respect to the fixing shaft; wherein an upper surface of the seat is formed with a plurality of recesses which are below the disk; the plurality of recesses are arranged along a circular path which is around a center of the fixing shaft; wherein the disk is rotatable with respect to the seat by using at least one ball; wherein the disk is formed with an installing hole; each installing hole is installed with one of the at least one ball; the installing hole is opened at a bottom side of the disk; a lower side of the ball exposes out from a lower opening of the installing hole and is located within one of the recesses of the disk; each ball has a respective spring which installed at an upper side of the ball and is confined with the installing hole; by elasticity of the spring, the ball may expose out of the disk or reduce into the installing hole; wherein when the disk rotates, the frame rotates with the disk, and the ball leave from the recess and is pressed by the seat so as to move into the respective installing hole; when the installing hole moves to another recess, the ball exposes out from the installing hole again so that the ball is embedded into another recess; therefore, the disk and the frame are fixed on various angles by moving the disk and the frame around the upper side of the seat by using a step by step way.

BRIEF DESCRIPTION OF THE DRAWINGS

FIG. 11 is a schematic view showing that the present invention is used to connect the supporting object.

FIG. 12 is a schematic view showing the supporting object of FIG. 11.

FIG. 13 is a partial schematic view showing that the supporting object of FIG. 12 is viewed from another viewing angle.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

In the present invention, a tablet computer 1 is used for description of the present invention, however the present invention is suitable for various kinds of tablet (or flat form) electronic devices, such as tablet computers, mobile phones, PDA (personal digital assistant), notebook computers, etc. Preferably, these tablet electronic device has a flat back side.

With reference to FIGS. 1 to 13, the structure of the present invention is illustrated. The present invention contains the following elements.

Figure 7:
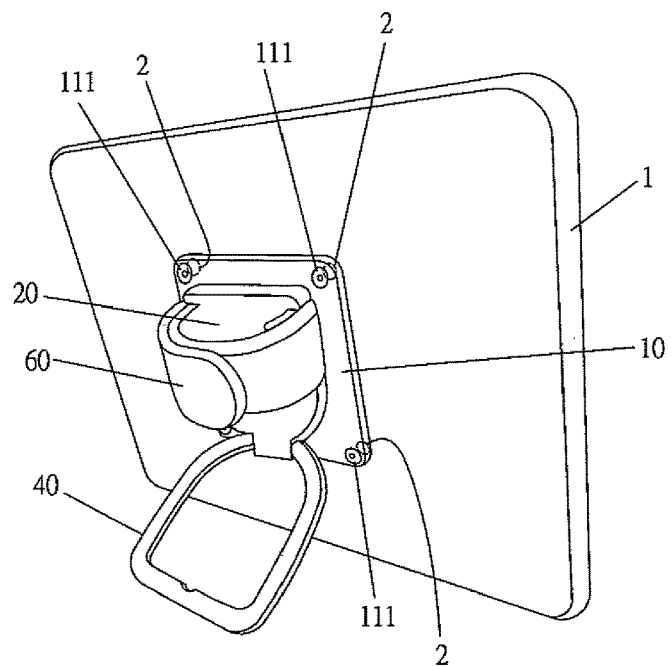
FIG. 7 is a schematic view showing that the present invention is used to support a tablet computer.

A seat 10 is included. The bottom of the seat 10 serves to connect a back side of the tablet computer 1. The seat 10 has a plurality of retaining holes 11. In installing, the seat 10 is connected to the tablet computer 1 by using a connecting unit 111 to pass through the retaining hole 11 of the seat 10 and a locking hole 2 of the tablet computer 1. Therefore, the seat 10 is installed to the tablet computer 1 (as shown in FIG. 7). Preferably, the seat 10 is a rectangular flat plate 13 and the plurality of retaining holes 11 are at four corners of the flat plate 13.

Figure 1:
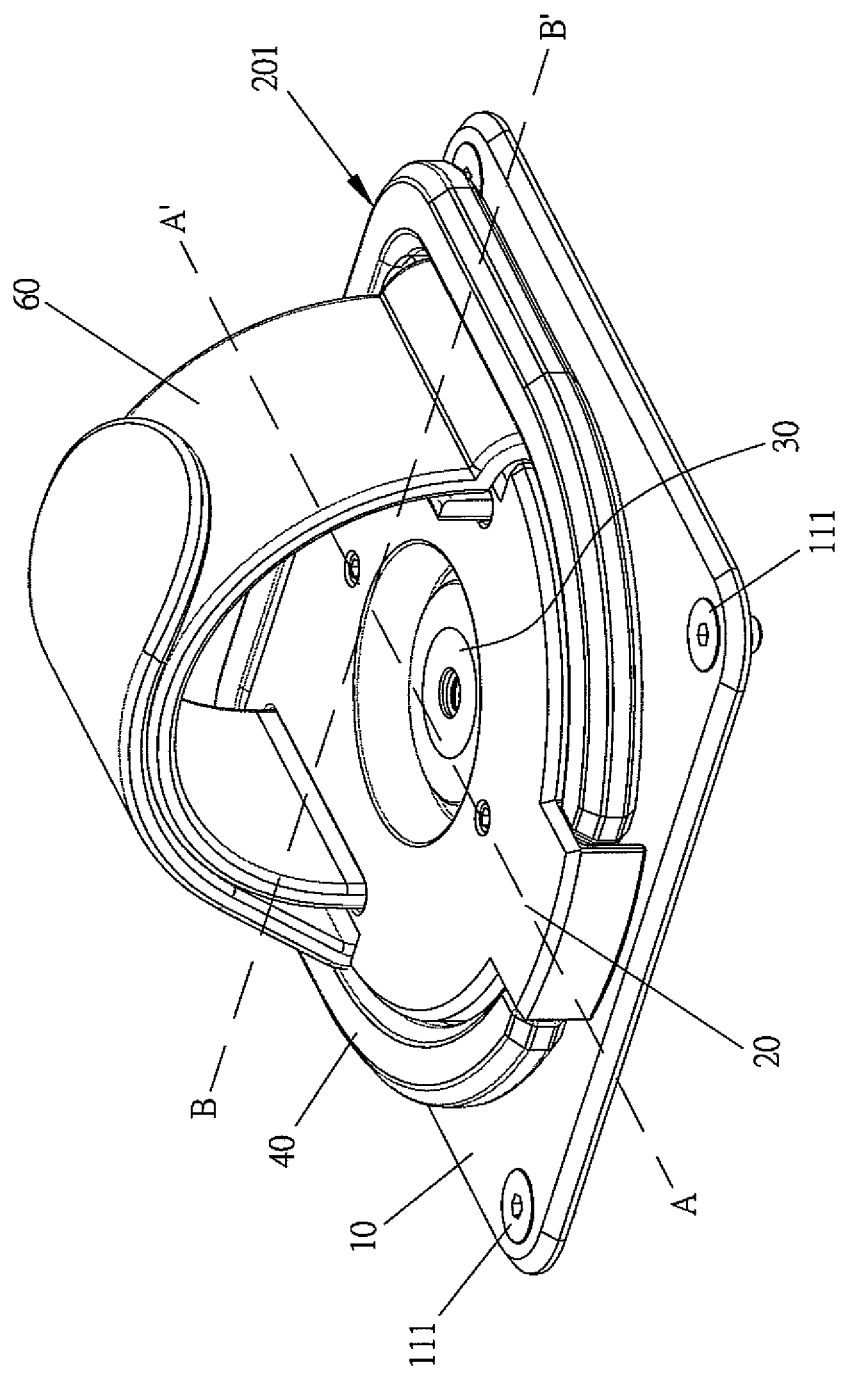
FIG. 1 is an assembly schematic view of the present invention.

A disk 20 is located above an upper side of the seat 10 and is rotatably installed to the seat 10 (as shown in FIG. 1). A center of the disk 20 has a through hole 21.

A fixing shaft 30 extends from an upper side of the seat 10 and penetrates through the through hole 21 of the disk 20. The disk 20 is loosely arranged to the seat 10 through the retaining hole 11 and is rotatable with respect to the fixing shaft 30.

Figure 3:
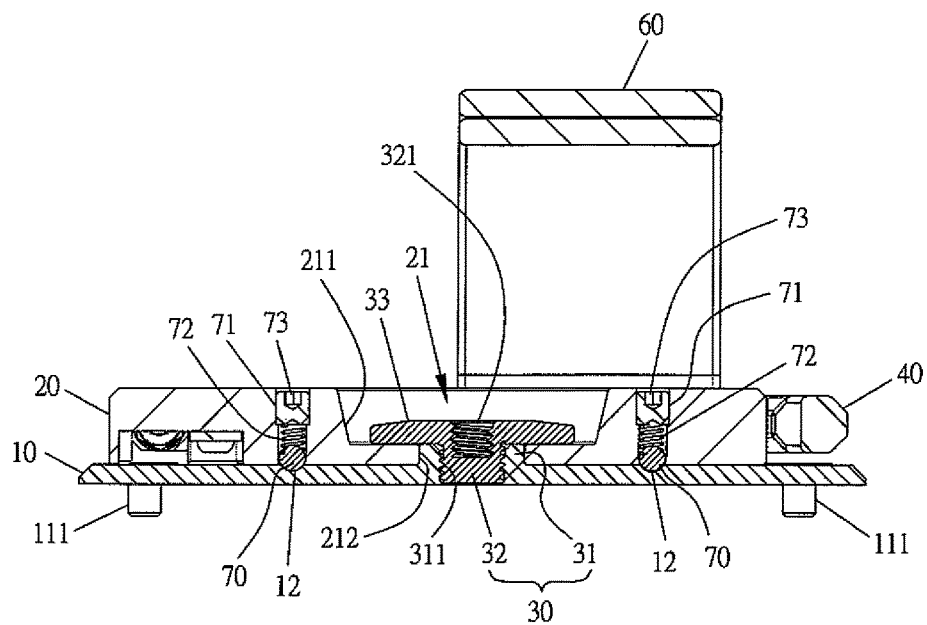
FIG. 3 is a schematic cross view along line A-A' of FIG. 1.

As shown in FIG. 3, the fixing shaft 30 contains a rotatable shaft 31 at a center portion of the seat 10 and a fixing unit 32 connected to an upper side of the rotatable shaft 31. A center of the rotatable shaft 31 is formed with a locking hole 311. An upper side of the fixing unit 32 is formed with an expansion portion 33 so that the disk 20 is clamped between the expansion portion 33 and the seat 10. A lower side of the fixing unit 32 is locked to the locking hole 311 of the rotatable shaft 31. Preferably, the rotatable shaft 31 and the seat 10 are integrally formed. The locking hole 311 of the rotatable shaft 31 penetrates through the seat 10.

Preferably, the through hole 21 contains an upper hole 211 and a lower hole 212 at a lower side of the upper hole 211. The cross section of upper hole 211 is larger than that of the lower hole 212. The expansion portion 33 at an upper end of the fixing unit 32 is embedded into the upper hole 211 of the through hole 21 so as to resist against a bottom of the upper hole 211 of the through hole 21.

The upper surface of the seat 10 is formed with a plurality of recesses 12 which are below the disk 20. The plurality of recesses 12 are arranged along a circular path 100 which is around a center of the fixing shaft 30. Preferably, the plurality of recesses 12 are 16 recesses 12 which are arranged around a round and are spaced with an equal distance. Two adjacent recesses 12 have an angle deviation of 22.5 degrees.

The disk 20 is rotatable with respect to the seat 10 by using at least one ball 70.

The disk 20 is formed with an installing hole 71. Each installing hole 71 is installed with one of the at least one ball 70. The installing hole 71 is opened at a bottom side of the disk 20. A lower side of the ball 70 exposes out from a lower opening of the installing hole 71 and is located within one of the recesses 12 of the disk 20. Each ball 70 has a respective spring 72 which installed at an upper side of the ball 70 and is confined with the installing hole 71. By elasticity of the spring 72, the ball 70 may expose out of the disk 20 or reduce into the installing hole 71.

Preferably, there are two balls 70. The two balls 70 are embedded into two of the recesses 12 which have angle deviation of 180 degrees.

Preferably, the installing hole 71 penetrates through the disk 20. A sealing unit 73 is arranged at an upper side of the installing hole 71 for sealing the spring 72 within the installing hole 71. In the drawing the sealing unit 73 is a screw.

By using above said structure, rotating the disk 20 with respect to the seat 10 will cause that the ball 70 moves from one recess 12 to another recess 12 so that the disk 20 moves around an upper side of the seat 10 through step by step way.

The disk 20 is formed with an application unit 201. By the application unit 201, the present invention may be provided with many applications.

In the present invention, the application unit 201 is a frame 40. One end of the frame 40 is pivotally installed at a side of the disk 20. By rotating the frame 40, the frame 40 can support the back side of the tablet computer 1 so as to cause the tablet computer 1 to stand. As shown in FIG. 7, an angle is formed between the frame 40 and the tablet computer 1.

Figure 9:
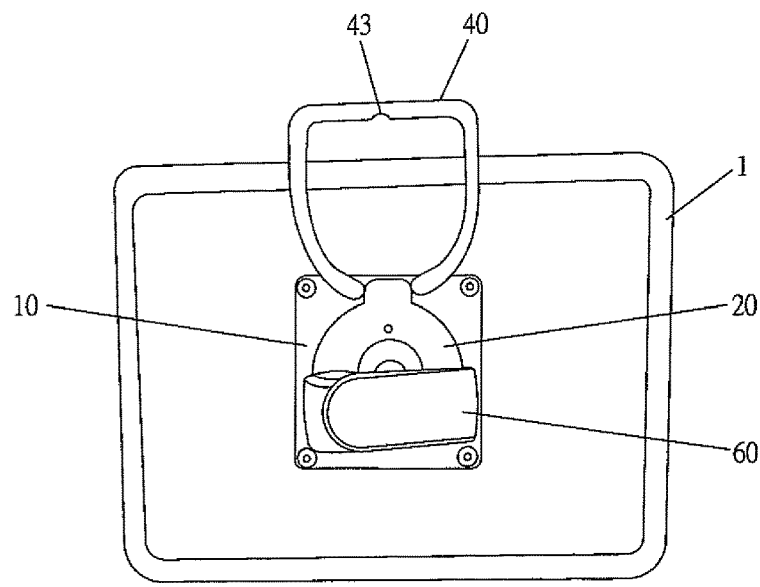
FIG. 9 is a schematic view showing an application which shows that the present invention is used as a hander.
Figure 10:
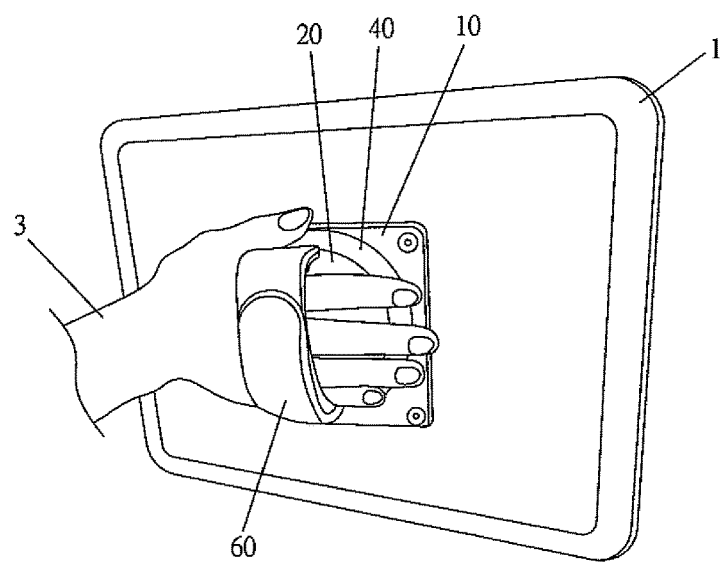
FIG. 10 is a schematic view showing the application of the hand strap.

By rotating the frame 40, the frame 40 is also used as a hander. As shown in FIG. 9, when the frame 40 is parallel to the tablet computer 1, a side of the frame 40 far away from the disk 20 serves to hang the tablet computer 1 on a specific location. Preferably, the side of the frame 40 far away from the disk 20 is formed with a groove 43 for receiving in a fixed end of an object (not shown).

When the disk 20 rotates, the frame 40 will rotate with the disk 20, and the ball 70 leave from the recess 12 and is pressed by the seat 10 so as to move into the respective installing hole 71. When the installing hole 71 moves to another recess 12, the ball 70 exposes out from the installing hole 71 again so that the ball 70 can be embedded into another recess 12. Therefore, the disk 20 and the frame 40 are fixed on various angles by moving the disk 20 and the frame 40 around the upper side of the seat 10 by using a step by step way. In this embodiment, the angle between two adjacent recesses 12 is 22.5 degree and therefore, when rotating the disk 20 through 22.5 degrees, the disk 20 is retained to next portion.

The side of the disk 20 pivotally installed to the frame 40 has a curve structure. The frame 40 has an approximate circular structure and is fitting to outlines of the disk 20. In a storing state, the frame 40 is annularly arranged an outer periphery of the disk 20.

Figure 5:
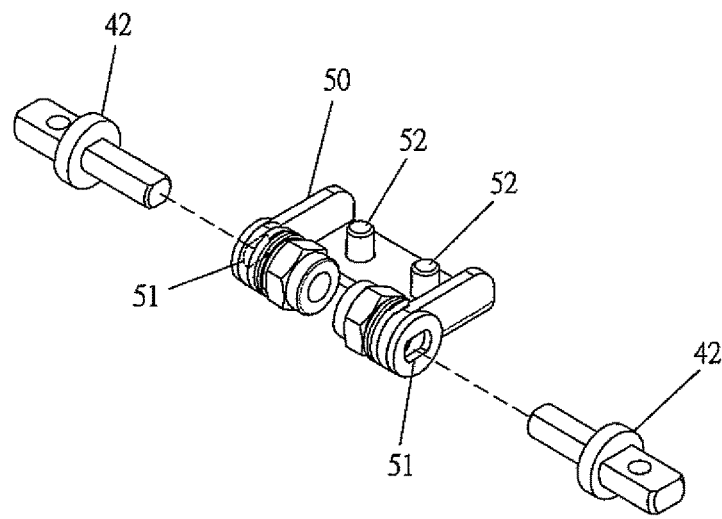
FIG. 5 is an exploded schematic view showing the pivotal unit and insertion unit of the present invention.
Figure 6:
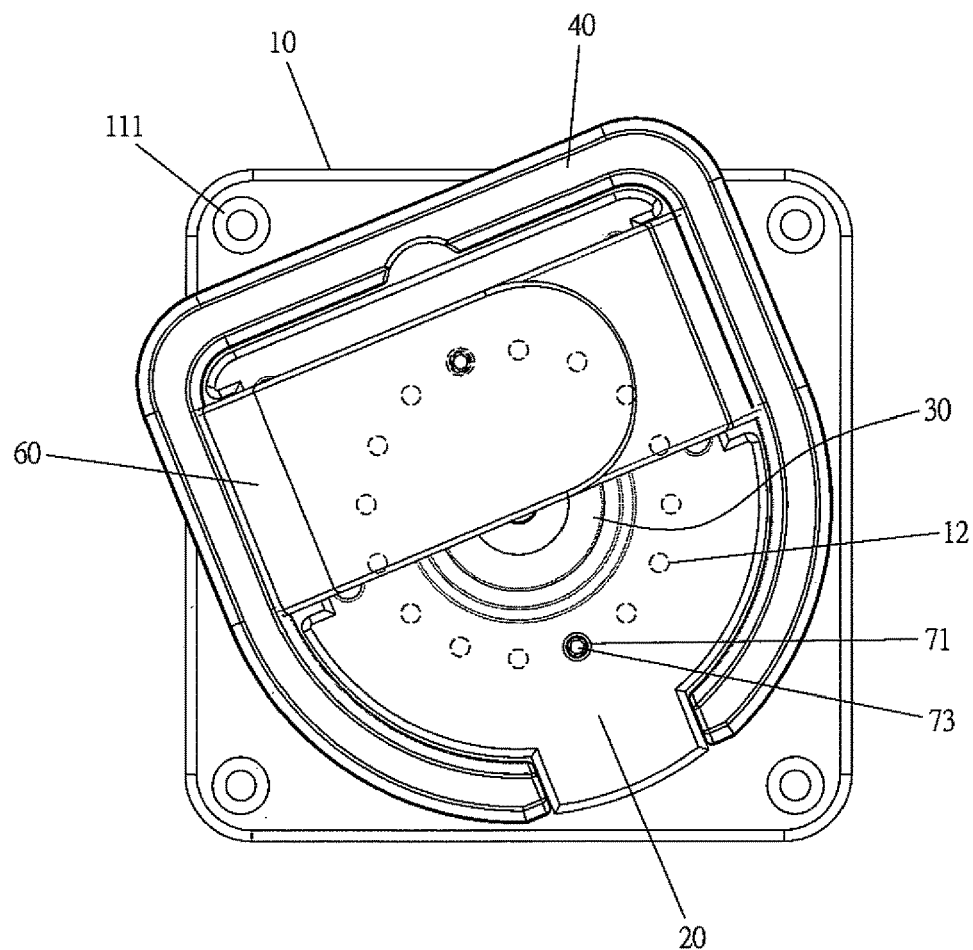
FIG. 6 is a schematic view showing the rotation of the disk.

The disk 20 is pivotally installed to the frame 40 by using a pivotal unit 50. The pivotal unit 50 is located at the side of the disk 20. Two ends of the pivotal unit 50 are formed with two respective pivotal holes 51. Two ends of the frame 40 are connected to the pivotal unit 50 by two respective inserting units 42. One end of the inserting unit 42 is installed on a respective connecting hole 41 at one of the two ends of the frame 40. Another end of the inserting unit 42 is inserted into the respective pivotal hole 51 at one of the two ends of the pivotal unit 50 (as shown in FIG. 5) so that the frame 40 is rotatable around a center of the inserting unit 42. Preferably, the pivotal unit 50 is locked on the disk 20 by using a screw 52. The two ends of the inserting unit 42 have a cylindrical structure and a middle part of the inserting unit 42 has a larger cross section than those of the two ends of the inserting unit 42.

A hand strap 60 is arranged across two sides of the disk 20 by a detachable way. The two sides of the disk 20 are formed with two via holes 22, respectively. A rib 23 is formed between one of the two via holes 22 and a respective one of the two sides of the disk 20. Totally, there are two ribs 23. Two ends of the hand strap 60 are wound around the respective ribs 23. A middle part of the hand strap 60 is arranged above the disk 20. The middle part of the hand strap 60 has an arc portion 61. The hand strap 60 serves to be held on a user's hand. A space between the hand strap 60 and the disk 20 serves to receive a user's hand 3 so that the hand strap 60 winds around the user's hand 3. Therefore, the user can take the tablet computer 1.

Figure 4:
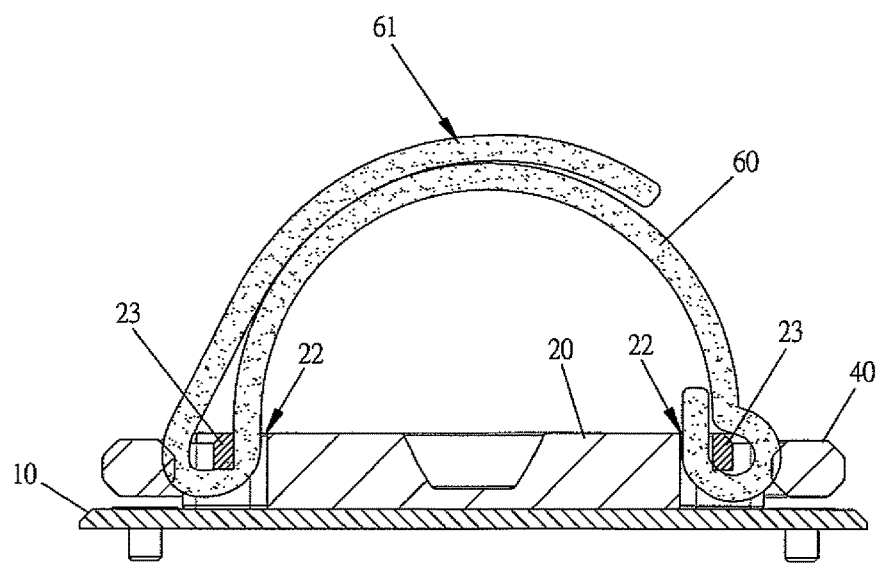
FIG. 4 is a schematic cross section view along line B-B' of FIG. 1.

As shown in FIG. 4, one end of the hand strap 60 passes an outer side of one of the two ribs 23 and passes through the via hole 22 of the respective rib 23 from the bottom of the via hole 22 to a top of the via hole 22 so as to connect to one end of the arc portion 61 of the hand strap 60. Another end of the hand strap 60 passes through another via hole 22 to reach the bottom of the disk 20 and passes from outer side of the respective rib 23 to reach a top of the disk 20 so as to connect to a upper side of the arc portion 61. By adjusting a location of another end of the hand strap 60, a size of the space between the arc portion 61 and the disk 20 is adjustable to suit the user's hand 3.

Preferably, the hand strap 60 is a Velcro. The two ends of the hand strap 60 are adhesive to the arc portion 61 of the hand strap 60.

Preferably, a hollow area 24 is formed between one of the two ribs 23 and a respective outer side of the disk 20. Totally, there are two hollow areas 24. The two ends of the hand strap 60 are embedded into the two hollow areas 24, respectively.

Figure 8:
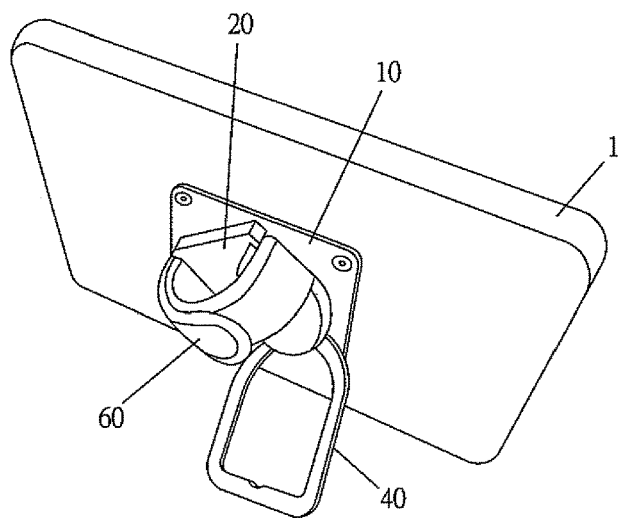
FIG. 8 is a schematic view showing the application of rotation of the disk and the turning of the frame.

When using, the seat 10 is installed to the tablet computer 1. For causing the tablet computer 1 to stand, the user can rotate the disk 20 to a specific direction to adjust the direction of the frame 40. Then the frame 40 is rotated to cause that the frame 40 can support the tablet computer 1, and therefore, the tablet computer 1 can stand. As shown in FIG. 8, a standing direction and a standing angle of the tablet computer 1 is changeable by adjusting the angle of the disk 20 and the angle between the frame 40 and the tablet computer 1.

For hanging the tablet computer 1, the user can rotate the disk 20 to a specific location to change the direction of the frame 40. Then, rotating the frame 40 causes the frame 40 to be hung from a specific location, such as a wall. A hanging angle of the tablet computer 1 is changeable by adjusting the angle of the disk 20.

If the user desires to take the tablet computer 1, the user can make his or her hand 3 pass through the space between the arc portion 61 of the hand strap 60 and the disk 20 so that the hand strap 60 winds around the user's hand 3. To take the tablet computer 1, the user can also directly hold the hand strap 60.

Figure 2:
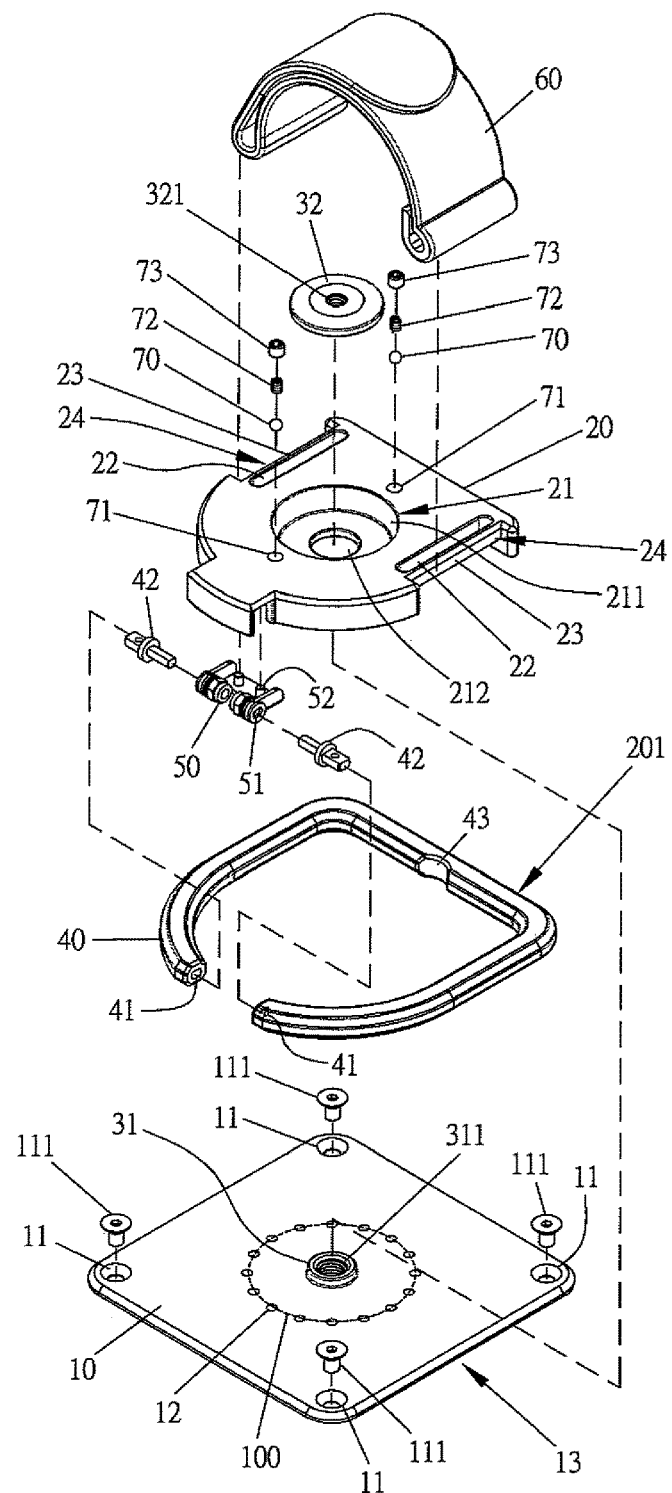
FIG. 2 is an exploded schematic view of the present invention.

As shown in FIG. 2, a center of the fixing unit 32 has a screw hole 321 for screwing an object. An application example is shown in FIG. 11. The tablet computer 1 is retained on a supporting object 80. The supporting object 80 is screwed to the screw hole 321 at the center of the fixing unit 32. The supporting object 80 contains a connecting magnetic surface 81 (as shown in FIGS. 12 and 13). A center of the connecting magnetic surface 81 has a screw rob 83 which is movable by using a screw ring 82. By connecting the connecting magnetic surface 81 and the outer surface of the fixing unit 32, and rotating the screw ring 82 to cause the screw rob 83 to screw into the screw hole 321 of the fixing unit 32, so that the supporting object 80 can be installed on the tablet computer 1 stably.

Advantages of the present invention are that the disk is retained by the ball and the recess of the seat. When using, the disk is retained at specific location so as not to be loose. Therefore, the stand frame of the present invention can support the tablet computer stably. The user can also hang the stand frame of the present invention on a specific location. For a long time, the lifetime of the stand frame of the present invention is prolonged. Furthermore, the hand strap is replaceable and is easy to be replaced, and these are beneficial in usage. The stand frame of the present invention is capable of being screwed to another device, such as an external supporting object for supporting the stand frame of the present invention. All above mentioned advantages of the present invention cannot be achieved by any prior art.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multifunctional stand frame for a tablet electronic device comprising:

a seat; a bottom of the seat serving to connect a back side of the tablet electronic device; the seat having a plurality of retaining holes; in installing, the seat being connected to the tablet electronic device by using a connecting unit to pass through a respective one of the plurality of the retaining holes of the seat and a locking hole of the tablet electronic device; so that the seat is installed to the tablet electronic device;

a disk being positioned above an upper side of the seat and being rotatably installed to the seat; a center of the disk having a through hole;

a fixing shaft extending from the upper side of the seat and penetrating through the through hole of the disk; the disk being loosely arranged to the seat and being rotatable with respect to the fixing shaft;

wherein an upper surface of the seat is formed with a plurality of recesses which are below the disk; the plurality of recesses are arranged along a circular path which is around a center of the fixing shaft;

wherein the disk is rotatable with respect to the seat by using at least one ball;

wherein the disk is formed with a plurality of installing hole; each installing hole is installed with one of the at least one ball; the installing hole is opened at a bottom side of the disk; a lower side of the ball exposes out from a lower opening of the installing hole and is located within one of the plurality of the recesses of the seat; the at least one ball has a respective spring which installed at an upper side of the ball and is confined with the installing hole; by elasticity of the spring, the ball may expose out of the disk or reduce into the installing hole;

wherein the disk is formed with a frame, when the disk rotates, the frame rotates with the disk, and the ball leave from the recess locating the ball and is pressed by the seat so as to move into the respective installing hole; when the installing hole moves to another one of the plurality of the recesses, the ball exposes out from the installing hole again so that the ball is embedded into another recess; therefore, the disk and the frame are fixed on various angles by moving the disk and the frame around the upper side of the seat.

2. The multifunctional stand frame for a tablet electronic device as claimed in claim 1, wherein the plurality of recesses are 16 recesses which are arranged around a round and are spaced with an equal distance; two adjacent recesses have an angle deviation of 22.5 degrees; therefore, when rotating the disk through 22.5 degrees, the disk is retained to next portion.

3. The multifunctional stand frame for a tablet electronic device as claimed in claim 1, wherein there are two balls; the two balls are embedded into respective two of the plurality of the recesses which have angle deviation of 180 degrees.

4. The multifunctional stand frame for a tablet electronic device as claimed in claim 1, wherein the installing hole penetrates through the disk; a sealing unit is arranged at an upper side of the installing hole for sealing the spring within the installing hole; the sealing unit is a screw.

5. The multifunctional stand frame for a tablet electronic device as claimed in claim 1, further comprising:
a hand strap being arranged across two sides of the disk; the two sides of the disk being formed with two via holes, respectively; a rib being formed between one of the two via holes and a respective one of the two sides of the disk; totally, there being two ribs; two ends of the hand strap being wound around the respective ribs; a middle part of the hand strap being arranged above the disk; and the middle part of the hand strap being an arc portion;
wherein to take the tablet electronic device, a user can directly hold the hand strap, or make his or her hand pass through a space between the arc portion of the hand strap and the disk so that the hand strap winds around the user's hand.

6. The multifunctional stand frame for a tablet electronic device as claimed in claim 5, wherein one end of the hand strap passes an outer side of one of the two ribs and passes through the via hole of the respective rib from the bottom of the via hole to a top of the via hole so as to connect to one end of the arc portion of the hand strap; another end of the hand strap passes through another via hole to reach the bottom of the disk and passes from outer side of the respective rib to reach a top of the disk so as to connect to a upper side of the arc portion; by adjusting a location of another end of the hand strap, a size of the space between the arc portion and the disk is adjustable to suit the user's hand.

7. The multifunctional stand frame for a tablet electronic device as claimed in claim 6, wherein the hand strap is a Velcro; and the two ends of the hand strap are adhesive to the arc portion of the hand strap.

8. The multifunctional stand frame for a tablet electronic device as claimed in claim 6, wherein a hollow area is formed between one of the two ribs and a respective outer side of the disk; totally, there are two hollow areas; and the two ends of the hand strap are embedded into the two hollow areas, respectively.

9. The multifunctional stand frame for a tablet electronic device as claimed in claim 1, wherein the disk is formed with the frame; and one end of the frame is pivotally installed at a side of the disk;
wherein by rotating the frame, the frame can support the back side of the tablet electronic device so as to cause the tablet electronic device to stand; and
wherein by rotating the frame, the frame is used as a hander; a side of the frame far away from the disk serves to hang the tablet electronic device on a specific location.

10. The multifunctional stand frame for a tablet electronic device as claimed in claim 9, wherein the side of the frame far away from the disk is formed with a groove for receiving in a fixed end of an object.

11. The multifunctional stand frame for a tablet electronic device as claimed in claim 9, wherein the side of the disk pivotally installed to the frame has a curve structure; the frame has an approximate circular structure and is fitting to outlines of the disk; in a storing state, the frame is annularly arranged an outer periphery of the disk.

12. The multifunctional stand frame for a tablet electronic device as claimed in claim 9, wherein the disk is pivotally installed to the frame by using a pivotal unit; the pivotal unit is located at the side of the disk; two ends of the pivotal unit are formed with two respective pivotal holes; two ends of the frame are connected to the pivotal unit by two respective inserting units; one end of the inserting unit is installed on a respective connecting hole at one of the two ends of the frame; and another end of the inserting unit is inserted into the respective pivotal hole at one of the two ends of the pivotal unit so that the frame is rotatable around a center of the inserting unit, and the pivotal unit is locked on the disk.

13. The multifunctional stand frame for a tablet electronic device as claimed in claim 12, wherein the two ends of the inserting unit have a cylindrical structure and a middle part of the inserting unit has a larger cross section than those of the two ends of the inserting unit.

14. The multifunctional stand frame for a tablet electronic device as claimed in claim 1, wherein the seat is a rectangular flat plate and the plurality of retaining holes are at four corners of the flat plate.

15. The multifunctional stand frame for a tablet electronic device as claimed in claim 1, wherein the fixing shaft contains a rotatable shaft at a center portion of the seat and a fixing unit connected to an upper side of the rotatable shaft; a center of the rotatable shaft is formed with a locking hole; an upper side of the fixing unit is formed with an expansion portion so that the disk is clamped between the expansion portion and the seat; a lower side of the fixing unit is locked to the locking hole of the rotatable shaft.

16. The multifunctional stand frame for a tablet electronic device as claimed in claim 15, wherein the locking hole of the rotatable shaft penetrates through the seat.

17. The multifunctional stand frame for a tablet electronic device as claimed in claim 1, wherein the through hole contains an upper hole and a lower hole at a lower side of the upper hole; the cross section of upper hole is larger than that of the lower hole; the expansion portion at an upper end of the fixing unit is embedded into the upper hole of the through hole so as to resist against a bottom of the upper hole of the through hole.

18. The multifunctional stand frame for a tablet electronic device as claimed in claim 15, wherein a center of the fixing unit has a screw hole for screwing an object.

19. The multifunctional stand frame for a tablet electronic device as claimed in claim 18, wherein the tablet electronic device is retained on a supporting object; the supporting object is screwed to the screw hole at the center of the fixing unit; the supporting object contains a connecting magnetic surface; a center of the connecting magnetic surface has a screw rob which is movable by using a screw ring; by connecting the connecting magnetic surface and the outer surface of the fixing unit, and rotating the screw ring to cause the screw rob to screw into the screw hole of the fixing unit, so that the supporting object is installed on the tablet electronic device stably.

20. The multifunctional stand frame for a tablet electronic device as claimed in claim 1, wherein the tablet electronic device is selected from tablet computers, mobile phones, PDA (personal digital assistant), and notebook computers.

* * * * *